Sept. 20, 1927.

A. F. WELCH 1,643,191

SEWING MACHINE MOTOR

Filed March 18, 1924

Inventor:
Alfred F. Welch,
by, *Alexander S. Lunt*
His Attorney

Patented Sept. 20, 1927.

1,643,191

UNITED STATES PATENT OFFICE.

ALFRED F. WELCH, OF FORT WAYNE, INDIANA, ASSIGNOR TO GENERAL ELECTRIC COMPANY, A CORPORATION OF NEW YORK.

SEWING-MACHINE MOTOR.

Application filed March 18, 1924. Serial No. 700,158.

My invention relates to an electric motor drive for sewing machines.

Sewing machines of the motor driven type now on the market are usually provided with motors which are removably mounted upon the machines. The motors on such machines occupy considerable space and are more or less in the way. In order that the motor shall occupy the minimum space, it has heretofore been proposed to locate the motor in such a position that it can be direct-connected to the sewing machine shaft. This is best done by locating the motor at the end of the machine head and utilizing the rotating parts of the motor as the flywheel element of the machine.

As heretofore constructed, in order to provide an exposed rotating part similar to the ordinary flywheel which can be used by the operator as a starting and stopping means, the armature of the motor has been arranged to rotate outside of the stationary field which is secured to the machine head. Such a construction is difficult to manufacture and is not as desirable as a motor built in accordance with standard practice, that is, with the armature rotating within a stationary field structure.

It is one of the objects of my invention to provide an electrically driven sewing machine in which the motor is built within the head of the machine and forms a part thereof, and which at the same time avoids the aforementioned objectionable features.

A further object of my invention is to provide an electric motor having means which will permit the operator to start and stop the machine by hand in much the same manner as is customary at present among operators using the usual type of domestic machine.

With the above and other objects in view, which will appear as the description proceeds, my invention resides in a novel construction, combination and arrangement of parts more fully described hereinafter and particularly defined in the claims appended hereto and forming a part of this specification.

Figure 1:
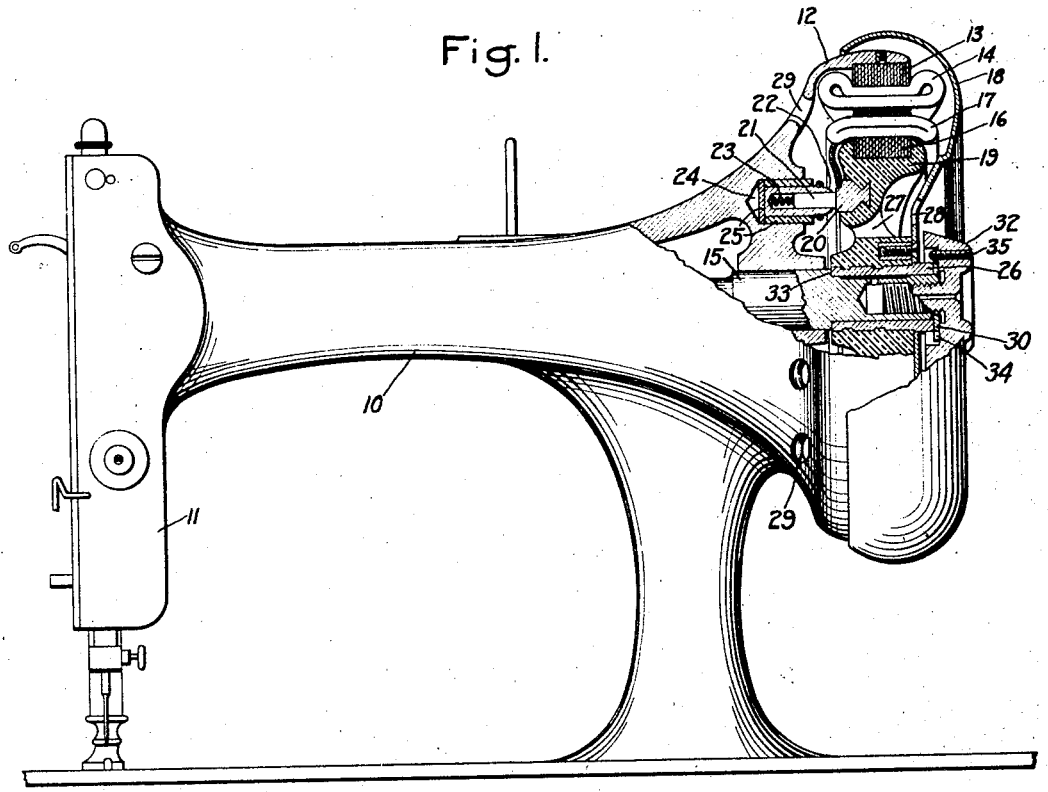
Figure 3:
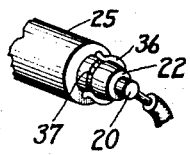
Figure 2:
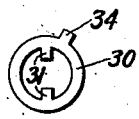

In the accompanying drawing, Fig. 1, is an elevation of a sewing machine head partly in section showing a motor built in accordance with my invention, and Figs. 2 and 3 are views of details.

In Fig. 1 of the drawing, a sewing machine is shown having an arm 10 which supports a needle bar head 11 as is the usual practice. The other end of the arm 10 is provided with a flared or enlarged portion 12 which forms the frame of an electric motor. A field structure 13 of an electric motor is secured in the frame thus formed and carries a field winding 14. A shaft 15 for driving the sewing machine elements extends through the arm 10 and supports an armature member 16 which is adapted to rotate within the field structure 13 and carry an armature winding 17. The armature member 16 is mounted upon a spider 19 which carries a shield member 18. The shield member 18 is secured to spider 19 near the shaft 15 and extends outwardly and over the flared portion 12 to form a protective covering for the motor and also provide means whereby the motor can be controlled by hand by the operator, as when starting and stopping the machine.

The spider 19 carries a commutator 20, and adjacent to the commutator and mounted within the flared portion 12 of the arm 10 are brushes 21 which co-operate with the commutator 19 to commutate the armature winding 17 when the motor is operating. The brushes 21 are supported by brushholders 22 and are biased toward the commutator 20 by springs 23. The brushholders 22 are located in recesses 24 in the arm 10 and are insulated therefrom by insulation 25. The field structure 13 of the electric motor is supported within the flared end 12 of the arm 10 and is composed of magnetic material having conductor slots in its inner periphery in which the field winding 14 is mounted. The armature member 16 of the electric motor is composed of similar magnetic material having conductor slots in its outer periphery into which the armature winding 17 is mounted. The armature member 16 is mounted in the outer periphery of the spider 19 which can be made of any suitable material such as bakelite or the like. Spider 19 is provided with a hub lining 26 of suitable bearing material such as brass or bronze and it is adapted to rotate freely about the end of the shaft 15 when disengaged therefrom by a clutch which will be described in more detail hereinafter.

A rotatable member built of a relatively light spider and a relatively heavy armature structure as described above will possess considerable flywheel effect due to the fact that the weight of the armature member 16 and commutator 20 are removed from the center of rotation. It is therefore possible to dispense with the usual flywheel and it also makes it unnecessary to rely upon the protecting shield 18 for any substantial flywheel effect. The commutator 20 is mounted on the side of the spider 19 and is adapted to commutate the winding 17 on the armature member 16 of the electric motor when it is in operation. Spider 19 is provided with passageways 27 which tend to set up a circulation of air within the enclosure about the windings 14 and 17, formed by the flared end 12 and the shield member 18. The shield member 18 is provided with openings 28 through which fresh air enters the enclosure and the flared end 12 is provided with openings 29 through which some of the circulating air is discharged, the remaining portion of discharged air passing between the outer edge of the shield member 18 and the outer side of the flared portion 12 of the arm 10. The shield 18 is secured to the hub of spider 19 and extends outwardly and is curved toward the arm 12 to partly surround the stator member 13 of the electric motor. As the motor operates the shield member 18 rotates and forms a smooth protecting shield for the rotating parts of the motor, is neat in appearance and does not interfere in the slightest degree with the free use of the hand of the operator in starting and stopping the machine.

In order to permit bobbins to be wound by the motor without driving the machine I provide a clutch for disconnecting the sewing machine shaft 15 from the rotatable member of the motor. This clutch consists of a friction washer 30 keyed to the shaft 15 by tongues 31 which engage keyways in the end of the shaft 15, and a nut 32 which is threaded in the end of the shaft 15. When the thumb nut 32 is tightened the rotatable member will be clamped to the shaft 15 between the friction washer 30 and a shoulder 33 formed on the shaft 15. The friction washer 30 as shown in Fig. 2 is provided with an outwardly extending tongue 34 which cooperates with a screw 35 in the thumb nut 32 to prevent the latter from running off the shaft 15.

Referring to Fig. 3, the brush leads are shown having a clip 36 which engages the groove 37 in the brushholders 22 and is adapted to carry the current to the brushes 21. This method of connecting the brushes permits the brushholders to be removed and the brushes replaced with a minimum of inconvenience.

Although I have described my invention with considerable detail and with respect to certain particular forms, I do not desire to be limited to such details since many changes and modifications may well be made without departing from the spirit and scope of my invention.

What I claim as new and desire to secure by Letters Patent of the United States is:

1. In a sewing machine, the combination of an arm having a needle bar at one end and flared at its other end to form the frame of an electric motor, a field structure for said motor supported within said flared end, a shaft for driving said machine extending into said arm, an armature member mounted upon said shaft and rotating within said field structure, and a shield member secured to and rotatable with said armature member extending over and about said field structure and adapted to be used as a hand operated means.

2. In a sewing machine, the combination of an arm, a field structure supported by said arm, a shaft for driving said machine extending into said arm, an armature member mounted upon said shaft and rotatable within said field structure, and a hand operating means secured to said armature member and constructed to extend over and enclose said field structure.

3. In a sewing machine, the combination of an arm, a field structure supported by said arm, a shaft for driving said machine extending into said arm, an armature member mounted upon said shaft and rotatable within said field structure, a hand operating member forming a shield about said armature member and said field structure, and ventilating openings in said member adapted to permit circulation of air about said field structure and armature member.

4. In a sewing machine, the combination of an arm having a needle bar head at one end and flared at its other end, a field structure of an electric motor supported by said flared end, a shaft extending into said arm, an armature member of an electric motor rotatably mounted upon said shaft, a shield member forming a hand wheel secured to said armature member and arranged to extend over the field structure, and friction means for securing said armature member to said shaft.

5. In a sewing machine, the combination of an arm, a field structure supported by said arm, a shaft extending into said arm, a spider of relatively light mass secured to said shaft, an armature structure of relatively large mass secured to the rim of said spider, and a cup shaped shield member secured to said spider extending over and about said field structure, said armature structure and spider forming an internally rotating flywheel and said shield forming an external hand operating means.

In witness whereof, I have hereunto set my hand this 15th day of March, 1924.

ALFRED F. WELCH.